No. 722,794. PATENTED MAR. 17, 1903.
F. E. ALLEN.
BIRD TRAP.
APPLICATION FILED JUNE 5, 1902.
NO MODEL.
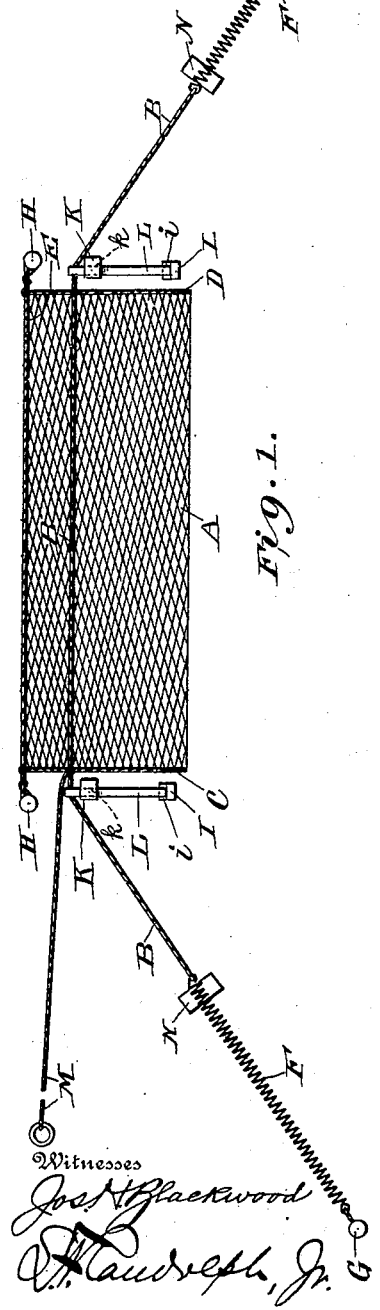
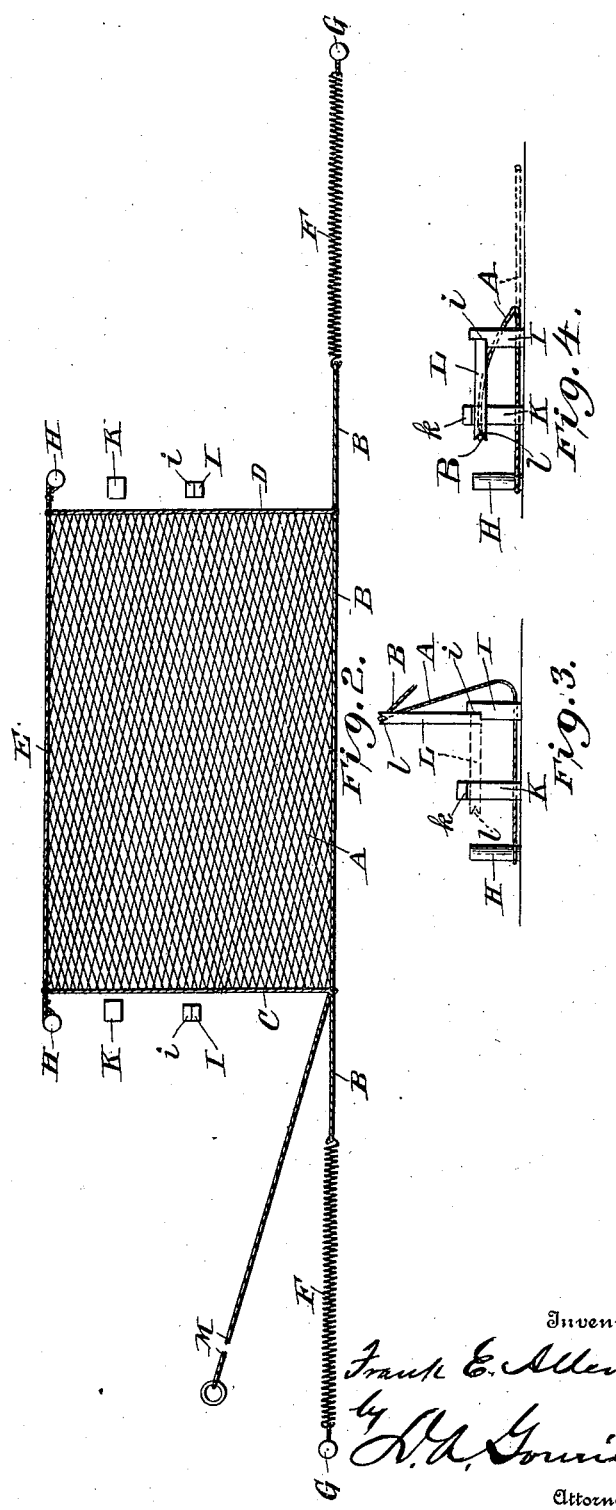

UNITED STATES PATENT OFFICE.

FRANK E. ALLEN, OF CARNEY, PENNSYLVANIA.

BIRD-TRAP.

SPECIFICATION forming part of Letters Patent No. 722,794, dated March 17, 1903.

Application filed June 5, 1902. Serial No. 110,360. (No model.)

*To all whom it may concern:*

Be it known that I, FRANK E. ALLEN, a citizen of the United States, residing at Carney, in the county of Wyoming and State of Pennsylvania, have invented certain new and useful Improvements in Bird-Traps, of which the following is a specification.

My invention relates to traps for ensnaring birds and small animals; and it consists of a net that is folded back on itself when set and spread over the victim by means of the pull exerted by coil-springs secured to the ends of rope holding one side of the net, the trap being sprung by means of a trigger-rope pulled by the trapper.

The advantages of my invention will fully appear hereinafter and by reference to the accompanying drawings, in which—

Figure 1 is a plan view of my invention when set; Fig. 2, a plan view after it is sprung; Fig. 3, a side view while the net is spreading over the ensnared victim; and Fig. 4, a side view showing in full lines the position of the net shown in Fig. 1 and in dotted lines the position shown in Fig. 2.

Referring to the drawings, in which similar reference characters indicate corresponding parts throughout the several views, A represents the net used in my invention, which is secured to the ropes B, C, D, and E. The ends of the rope B are extended beyond the sides of the net A and are each secured to a coil-spring F, which is fastened to a post G, driven into the ground. The rope E is also extended on each side beyond the junction with the ropes C and D and secured to stakes H H, also driven into the ground.

I I represent stakes having a rectangular notch $i$ at their tops, driven into the ground at a short distance on each side of the net A and about one-half the distance between the ropes B and E.

K K represent stakes set between stakes I I and the rope E and having a projection $k$ on their top, both projections extending in the same direction, in the drawings shown toward the left while standing at rope B and looking toward the rope E.

L L represent trigger-pieces which rest in the rectangular notches $i$ $i$ in the stakes I I and under the extensions $k$ $k$ of the stakes K K, and have notches $l$ $l$ to receive and hold the rope B when the net is set.

M represents the trigger-rope, which is pulled by the trapper to spring the trap.

N represent small blocks that may be set under the springs F to keep them off the ground.

The operation of my invention is as follows: To set the trap, the rope B is drawn back against the resilience of the springs F F and inserted in the notches $l$ $l$ of the trigger-pieces L L. This folds the net back on itself. The bait is then placed on the ground that is covered by the front part of the net when stretched, and the trapper retires with the end of the trigger-rope M to a place of concealment. When the victim has settled to eat the bait, the trigger-rope is given a pull, which draws the two trigger-pieces L L out from under the projections $k$ $k$ of the stakes K K, which permits the springs F F to draw the net over the victim. The trigger-pieces L L by swinging on the notches $i$ $i$ in the stakes I I as a base carry the front of the net up and over the victim, so as to intercept its flight if a bird and it should become frightened at the springing of the trap.

Having thus described my invention, what I claim is—

1. In a bird-trap, two substantially parallel ropes secured to stakes, one of said ropes having its ends resiliently secured, a net stretched between said ropes, and means to hold said net folded back on itself, substantially as shown and described.

2. In a bird-trap, a rope having its ends resiliently secured, a rope substantially parallel therewith having its ends rigidly secured, a net stretched between said ropes, means to hold said resiliently-secured side of the net folded back on the rigidly-secured side, and means to release said resiliently-secured side, substantially as shown and described.

3. In a bird-trap, coil-springs secured to stakes at a distance from one another, a rope stretched between the free ends of said coil-springs, a rope substantially parallel with said spring-held rope rigidly secured to stakes, a net attached to said ropes, means to hold said spring-held rope against the resilience of the springs and the net folded back on itself, means to release said rope to the action of said springs, and means to cause the net to describe an arc under the action of said springs, substantially as shown and described.

4. In a bird-trap, a rope resiliently secured at its ends to stakes, a rope substantially parallel therewith rigidly secured to stakes, a net attached to said ropes, notched stakes driven at each side of said net, posts driven between said notched stakes and said rigidly-secured rope, a projection on the top of said posts, notched trigger-pieces resting on said notched stakes and under said projections to receive said resiliently-secured rope, and a trigger-rope secured to said resiliently-secured rope, substantially as shown and described.

5. In a bird-trap, coil-springs secured to stakes set at a distance from each other, a rope stretched between said springs, a rope substantially parallel with said spring-held rope rigidly secured to stakes, a net attached to said ropes, notched stakes driven at each side of said net, posts driven between said notched stakes and said rigidly-secured rope, a projection on the top of said posts, trigger-pieces to receive said spring-held rope resting on said notched stakes and under the projections on said posts to hold the said rope against the resilience of said springs, and a trigger-rope to remove said trigger-pieces from under said projections, substantially as shown and described.

In testimony whereof I hereto affix my signature in the presence of two witnesses.

FRANK E. ALLEN.

Witnesses:
WALTER HARLEY,
LIZZIE HARLEY.